(12) United States Patent
Chawla et al.

(10) Patent No.: US 9,100,235 B2
(45) Date of Patent: Aug. 4, 2015

(54) SECURE DESKTOP APPLICATIONS FOR AN OPEN COMPUTING PLATFORM

(75) Inventors: Deepak Chawla, Ocean, NJ (US); Urs A. Muller, Keyport, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 179 days.

(21) Appl. No.: 13/290,852

(22) Filed: Nov. 7, 2011

(65) Prior Publication Data

US 2013/0117561 A1 May 9, 2013

(51) Int. Cl.
| | |
|---|---|
| *H04L 29/06* | (2006.01) |
| *H04W 4/00* | (2009.01) |
| *H04L 9/08* | (2006.01) |

(52) U.S. Cl.
CPC ............ *H04L 29/06* (2013.01); *H04L 63/0442* (2013.01); *H04W 4/003* (2013.01); *H04L 9/0891* (2013.01); *H04L 63/0272* (2013.01)

(58) Field of Classification Search
CPC ...... G06F 21/62; G06F 21/6218; H04L 63/08
USPC ......................................................... 713/158
See application file for complete search history.

(56) References Cited

U.S. PATENT DOCUMENTS

| | | | |
|---|---|---|---|
| 5,974,549 A | 10/1999 | Golan | |
| 6,212,564 B1 | 4/2001 | Harter et al. | |
| 6,571,245 B2 | 5/2003 | Huang et al. | |
| 6,981,281 B1 | 12/2005 | LaMacchia et al. | |
| 7,127,719 B2 | 10/2006 | Evans et al. | |
| 7,325,040 B2 | 1/2008 | Truong | |
| 7,346,649 B1 | 3/2008 | Wong | |
| 7,430,743 B2 | 9/2008 | Watt et al. | |
| 7,475,408 B2 | 1/2009 | Alcazar et al. | |
| 7,627,658 B2 | 12/2009 | Levett et al. | |
| 7,685,598 B1 * | 3/2010 | Badenell et al. | ............... 718/104 |
| 7,832,004 B2 | 11/2010 | Schwartz et al. | |
| 7,873,071 B2 | 1/2011 | Ung et al. | |
| 8,225,404 B2 | 7/2012 | Freericks et al. | |
| 2002/0010736 A1 | 1/2002 | Marques et al. | |
| 2002/0191797 A1 * | 12/2002 | Perlman | ......................... 380/281 |

(Continued)

FOREIGN PATENT DOCUMENTS

WO        2009015470        2/2009

OTHER PUBLICATIONS

Allen, Christopher, and Tim Dierks. "The TLS protocol version 1.0." (1999).*

(Continued)

*Primary Examiner* — S. Ali Zaidi
(74) *Attorney, Agent, or Firm* — Hanley, Flight & Zimmerman, LLC

(57) ABSTRACT

Example secure desktop applications for an open computing platform are disclosed. An example secure desktop method for a computing platform disclosed herein comprises establishing a secure communication connection between a secure desktop provided by the computing platform and a trusted entity, the secure communication connection being accessible to a trusted application authenticated with the secure desktop, the secure communication connection being inaccessible to an untrusted application not authenticated with the secure desktop, and securing data that is stored by the secure desktop in local storage associated with the computing platform, the stored data being accessible to the trusted application and inaccessible to the untrusted application.

20 Claims, 8 Drawing Sheets

(56) References Cited

U.S. PATENT DOCUMENTS

| | | |
|---|---|---|
| 2003/0041267 A1 | 2/2003 | Fee et al. |
| 2003/0159070 A1 | 8/2003 | Mayer et al. |
| 2004/0039911 A1* | 2/2004 | Oka et al. ............... 713/175 |
| 2005/0021668 A1 | 1/2005 | Beesley et al. |
| 2005/0267975 A1* | 12/2005 | Qureshi et al. ............ 709/229 |
| 2007/0256073 A1 | 11/2007 | Troung et al. |
| 2008/0016337 A1* | 1/2008 | Morgan et al. ............ 713/158 |
| 2008/0123854 A1 | 5/2008 | Peel et al. |
| 2009/0064311 A1 | 3/2009 | Clark et al. |
| 2009/0106549 A1* | 4/2009 | Mohamed ................. 713/156 |
| 2009/0187763 A1 | 7/2009 | Freericks et al. |
| 2009/0187991 A1 | 7/2009 | Freericks et al. |
| 2010/0153569 A1 | 6/2010 | Schreiber |
| 2010/0269135 A1 | 10/2010 | Hulse et al. |
| 2011/0247045 A1 | 10/2011 | Rajagopal et al. |
| 2013/0097688 A1 | 4/2013 | Bradley, II et al. |
| 2013/0117804 A1 | 5/2013 | Chawla et al. |

OTHER PUBLICATIONS

United States Patent and Trademark Office, "Office Action," issued in connection with U.S. Appl. No. 13/290,857 on Dec. 30, 2013, 11 pages.

United States Patent and Trademark Office, "Office Action," issued in connection with U.S. Appl. No. 13/290,857 on Jul. 17, 2013, 12 pages.

United States Patent and Trademark Office, "Non-Final Office Action", issued in connection with U.S. Appl. No. 13/290,857, dated Oct. 3, 2014 (10 pages).

United States Patent and Trademark Office, "Notice of Allowance", issued in connection with U.S. Appl. No. 13/290,857, dated Jan. 30, 2015 (7 pages).

* cited by examiner

SECURE DESKTOP APPLICATIONS FOR AN OPEN COMPUTING PLATFORM

FIELD OF THE DISCLOSURE

This disclosure relates generally to computing platforms and, more particularly, to a secure desktop applications for an open computing platform.

BACKGROUND

Computing platforms, such as personal computers, tablets, smartphones, etc., are frequently used to access and work with sensitive data. Such sensitive data can include, for example, proprietary and/or private data, classified information, financial data, sensitive personal information, etc. Modern computing platforms typically include an operating system layer, a communication layer, and a suite of applications. In many instances, the computing platform used to access sensitive data is open such that there are no inherent restrictions on which applications can and cannot be installed on and executed by the platform's operating system.

DETAILED DESCRIPTION

Figure 1:
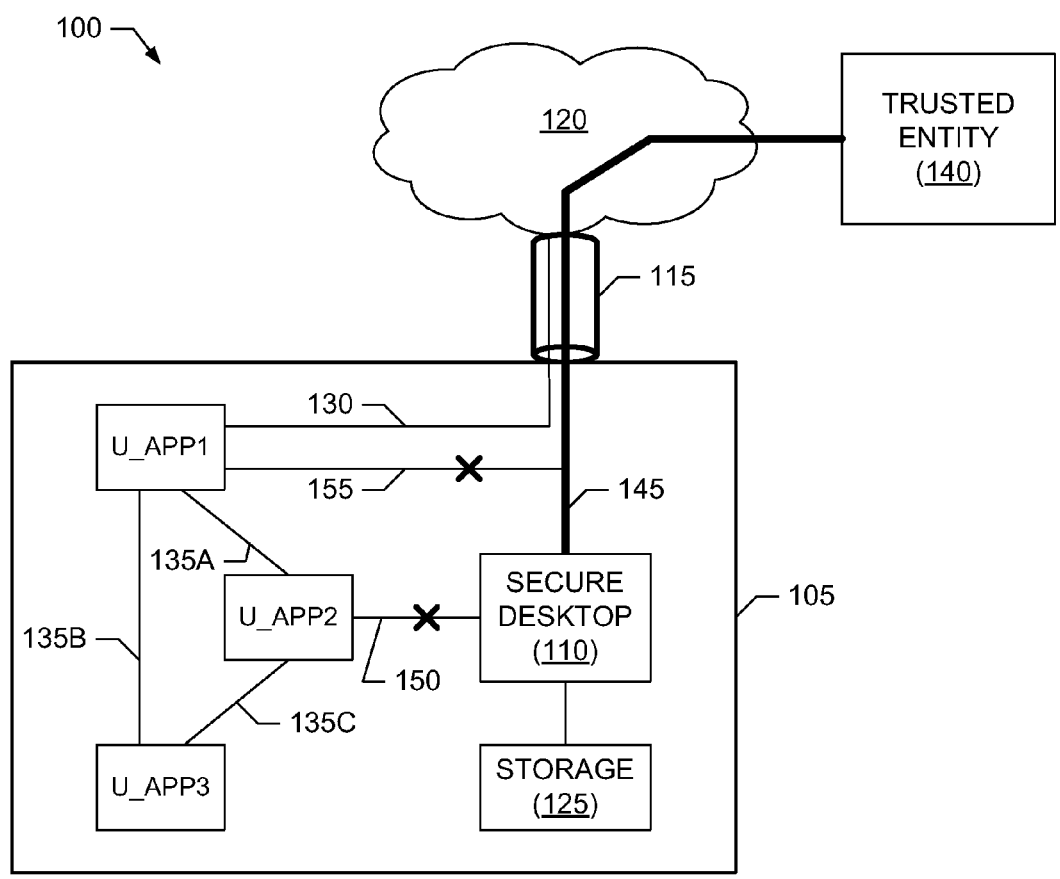
FIG. 1 is block diagram of an example system including an example computing platform supporting an example secure desktop as disclosed herein.

Example secure desktop applications for an open computing platform are disclosed herein. An example method disclosed herein to implement a secure desktop for a computing platform includes establishing a secure communication connection between a trusted entity and the secure desktop provided by the computing platform. For example, the secure communication connection can be an encrypted communication connection carried by a virtual private network established over an open and untrusted network, such as the Internet. As described in greater detail below, the secure communication connection can be accessible to a trusted application authenticated with the secure desktop, whereas the secure communication connection can be inaccessible to an untrusted application not authenticated with the secure desktop. The example method also includes securing stored data that is stored by the secure desktop in local storage associated with the computing platform. As described in greater detail below, the stored data can be accessible to the trusted application and inaccessible to the untrusted application.

In some examples, the method further includes refusing inter-process communication requests received by the secure desktop unless they are made via an application programming interface provided by the secure desktop. For example, the secure desktop can expose the application programming interface to one or more trusted applications to enable the trusted application(s), but not any untrusted application(s), to access the secure communication connection and/or to access the stored data that is stored securely by the secure desktop in the local storage. In some examples, the application programming interface is exposed to a trusted application after the application becomes trusted through a successful authentication procedure.

In some examples, the method establishes the secure communication connection between the trusted entity and the secure desktop in response to successful authentication of the secure desktop and/or a user associated with the secure desktop by the trusted entity. Additionally or alternatively, in some examples, the method secures the stored data in local storage by using a set of keys (e.g., such as one or more public encryption keys) to perform just-in-time encryption of data to be written to the local storage, and to perform just-in-time decryption of data to be read from the local storage. In such an example, the method can also include detecting termination of the secure communication connection between the trusted entity and the secure desktop, and revoking the set of keys when the termination of the secure communication connection is detected (e.g., to prevent access to sensitive, secured data after the secure connection with the trusted entity is terminated). In some examples, the method waits until after expiration of a time period beginning when the termination of the secure communication connection is detected before revoking the set of keys (e.g., to support off-line access to the sensitive, secured data for a period of time after the secure connection to the trusted entity is terminated). Additionally or alternatively, in some examples the method can wait to revoke the set of keys until the secure desktop itself is to be terminated to permit access to the sensitive, secured data while the secure desktop is active (even if the secure communication connection has been terminated).

As noted above, open computing platforms that have no inherent restrictions on which applications can and cannot be installed on and executed by the platform's operating system are often used to access sensitive data associated with a trusted entity, such as an enterprise, a bank, etc. As such, the risk of sensitive personal information and/or identity information being compromised is already high and likely to increase. Open computing platforms that do not employ the example secure desktop applications disclosed herein can be vulnerable to malware and/or other types of malicious code that can gain access to and compromise this sensitive data.

Some prior techniques to mitigate this threat involve using a virtual private network (VPN) to restrict access to the sensitive data available at a trusted entity and to secure the communication of this sensitive data between the trusted entity and the computing platform. For example, to access sensitive data (e.g., proprietary corporate data, sensitive personal information, etc.) from a computing device, an enterprise or, more generally, a trusted entity may mandate installation of a VPN client on the computing device. The VPN allows a trusted user (e.g., an employee, a trusted customer, etc.) to establish a secure connection between the trusted entity and the computing device over an open and untrusted network, such as the Internet. However, while the VPN protects against external intruders, it offers no protection against malicious code that finds its way onto the open computing device. Because a VPN establishes a connection between the trusted entity and the device's operating system, and not between the trusted entity and a specific application executing on the device, a VPN connection can be open for use by any application that runs on the device, including malicious code.

Other prior techniques to reduce the vulnerability of computing platforms to malicious code include virus scanners and removing administrative privileges for users, such that they cannot install applications on the computing platforms themselves. However, such measures can be costly, inconvenient, and only partially effective. For example, without administrative privileges, a user may be unable to install and use productivity software that does not need access to sensitive data, such as travel assist software, news applications, hotel reservation applications, dictionaries, etc.

Unlike such prior techniques that attempt to mitigate the threat of unauthorized access to sensitive data, disclosed example methods, apparatus and articles of manufacture for providing a secure desktop environment (also referred to as a trusted enclave environment) in the computing platform can prevent untrusted applications from accessing a secure connection established between a trusted entity and the secure desktop on an otherwise open computing platform. In some examples, the secure desktop environment disclosed herein can also prevent untrusted applications from being able to access and compromise sensitive data that is stored locally on the otherwise open computing platform. In some examples, the secure desktop environment disclosed herein can further prevent untrusted applications from communicating with the secure desktop environment and/or trusted applications executing in the context of the secure desktop environment.

Turning to the figures, a block diagram of an example system 100 that includes an example computing platform 105 supporting an example secure desktop 110 as disclosed herein is illustrated in FIG. 1. The computing platform 105 can correspond to any type of computing device, such as any personal computer, laptop, smartphone, cellular phone, computing pad, personal digital assistant, tablet personal computer, personal communicator, kiosk, server, etc. In the illustrated example, the computing platform 105 is an open computing platform in which there are few (and possibly no) inherent restrictions on which applications can and cannot be installed on and executed by the platform's operating system. As described in greater detail below, the secure desktop 110 is able to provide a secure area or trusted enclave in the otherwise open computing platform 105.

The computing platform 105 includes a communication interface to provide at least one example network connection 115 to an example communication network 120. In the illustrated example of FIG. 1, the communication network 120 is an open and untrusted network 120, such as the Internet. The network connection 115 can be established using any type of wired and/or wireless technology capable of providing connectivity to the communication network 120. For example, the network connection 115 can correspond to a fiber, cable and/or digital subscriber line connection to an Internet service provider (ISP); one or more mobile (e.g., cellular) data channels conforming to any type of mobile network communication protocol, such as the 3$^{rd}$ Generation Partnership Project (3GPP) Long Term Evolution (LTE) wireless communication standard, the General Packet Radio Service (GPRS) for second generation (2G) protocol, the Wideband-Code Division Multiple Access (W-CDMA)-based third generation (3G) protocol, the Universal Mobile Telecommunication System (UMTS) protocol, the Global System for Mobile Communications (GSM) protocol, etc.; a wireless local area network (WLAN) connection; a Bluetooth connection; etc. In the illustrated example, the network connection 115 is also open and untrusted such that any application executing on the computing platform 105 can access the network connection 115. As used herein, an application can include, for example, any type of computing application or app, program, code, procedure, process, function, widget, etc., able to be installed on and/or executed or otherwise performed by the computing platform 105.

For example, the computing platform 105 of the illustrated example includes and is able to execute example untrusted applications U_APP1, U_APP2 and U_APP3. Although three (3) untrusted applications U_APP1, U_APP2 and U_APP3 are illustrated in the example of FIG. 1, the computing platform 105 can support any appropriate number of untrusted applications. Untrusted applications include, for example, applications that do not undergo authentication and/or whose origins may be unknown. As such, one or more of the untrusted applications U_APP1-U_APP3 could be malware and/or other malicious or unauthorized code that, for example, attempts to gain access to and comprise sensitive data stored on the computing platform 105.

In the illustrated example of FIG. 1, the untrusted applications U_APP1-U_APP3 executing on the computing platform 105 can access example storage 125 of the computing platform 105. As such, the untrusted applications U_APP1-U_APP3 can read data from and write data to the storage 125, which could enable malicious code to retrieve and/or overwrite (e.g., corrupt) unprotected sensitive data stored in the storage 125. The storage 125 can correspond to any type or combination of temporary and/or permanent storage media, such as one or more of cache, volatile memory, flash memory, local disk storage, etc., including but not limited to the mass storage devices 830 and/or volatile memory 818 in the example processing system 800 of FIG. 8, which is described in greater detail below. Although one storage element 125 is illustrated in the example of FIG. 1, the computing platform 105 can support an appropriate number of storage elements 125.

Additionally, in the illustrated example of FIG. 1, one or more of the untrusted applications U_APP1-U_APP3 can establish connections to the untrusted network 120. For example, the untrusted applications U_APP1 can establish an example communication connection 130, such as a data stream, a data session, etc., with the untrusted network 120 via the communication connection 115, as shown. In the example of FIG. 1, the untrusted applications U_APP1-U_APP3 can also communicate or, in other words, exchange data with each other via, for example, inter-process connections 135A-C, as shown. The inter-process connections 135A-C can be implemented by inter-process communications, memory area mappings, signals, etc., and/or any other type(s) of inter-process connection(s) supported by the operating system and/or storage 125 of the computing platform 105.

As mentioned above, the computing platform 105 includes the secure desktop 110 (also referred to as a secure desktop application, a trusted enclave application, etc.) to provide a secure area or trusted enclave in the otherwise open computing platform 105. In some examples, from the perspective of the open computing platform 105, there may be no noticeable difference between the secure desktop 110 and the untrusted applications U_APP1-U_APP3 (e.g., in terms of their interaction with the platform's operating system). However, from the perspective of an example trusted entity 140 with which the computing platform 105 is to communicate via the untrusted network 120, the secure desktop 110 is considered to be a trusted application. Trusted applications include, for example, applications that undergo authentication and/or whose origins can otherwise be known. The trusted entity 140 can correspond to any enterprise, business, server, computer, processing cloud, etc., accessible by the computing platform 105 and that employs authentication and/or other trusted computing techniques to establish trusted communications and/or data access for users, applications, devices, etc., that access the trusted entity 140.

Because the secure desktop 110 is a trusted application from the perspective of the trusted entity 140, the secure desktop 110 can establish an example secure communication connection 145 with the trusted entity 140 via the communication connection 115, as shown in FIG. 1 and described in greater detail below. For example, the secure communication connection 145 can correspond to one or more encrypted data streams, data sessions, etc., employing any type of data encryption, such as encryption according to the data encryption standard (DES), advanced encryption standard (AES), etc. In the illustrated example, the secure desktop 110 provides the communication endpoint for the secure connection 145 on the computing platform 105. As such, the secure connection 145 is accessible only via the secure desktop 110. This is unlike prior computing platforms in which a secure connection, such as a virtual private network (VPN), is terminated at the operating system and, thus, could be accessed by any application via the operating system. However, the secure communication connection 145 could be carried by a VPN established between the computing platform 105 and the trusted entity 140 via the communication connection 115. As described in greater detail below, to prevent the untrusted applications U_APP1-U_APP3 from being able to access the secure connection 145, the secure desktop 110 does not exchange data with the untrusted applications U_APP1-U_APP3 (which is illustrated in FIG. 1 by a line 150 having an "X" drawn through it). Because the untrusted applications U_APP1-U_APP3 cannot exchange data with the secure desktop 110, and the secure desktop 110 provides the communication endpoint for the secure connection 145, the untrusted applications U_APP1-U_APP3 also cannot access the secure connection 145 between the secure desktop 110 and the trusted entity 140 (which is illustrated in FIG. 1 by a line 155 having an "X" drawn through it). In some examples, the secure desktop 110 also provides local data security, as described in greater detail below, to prevent the untrusted applications U_APP1-U_APP3 from being able to access data stored by the secure desktop 110 in the otherwise unsecured local storage 125 of the computing platform 105.

Although the example computing platform 105 is illustrated in FIG. 1 as supporting one secure desktop 110 providing one secure connection 145 to one trusted entity 140 via one network 120, the secure desktop 110 can be used to provide multiple secure connections to the same or different trusted entities over the same or different networks. Furthermore, multiple secure desktops 110 can be included in or executed by the computing platform 105 to provide, for example, different respective secure connections 145 to different respective trusted entities 140.

Figure 2:
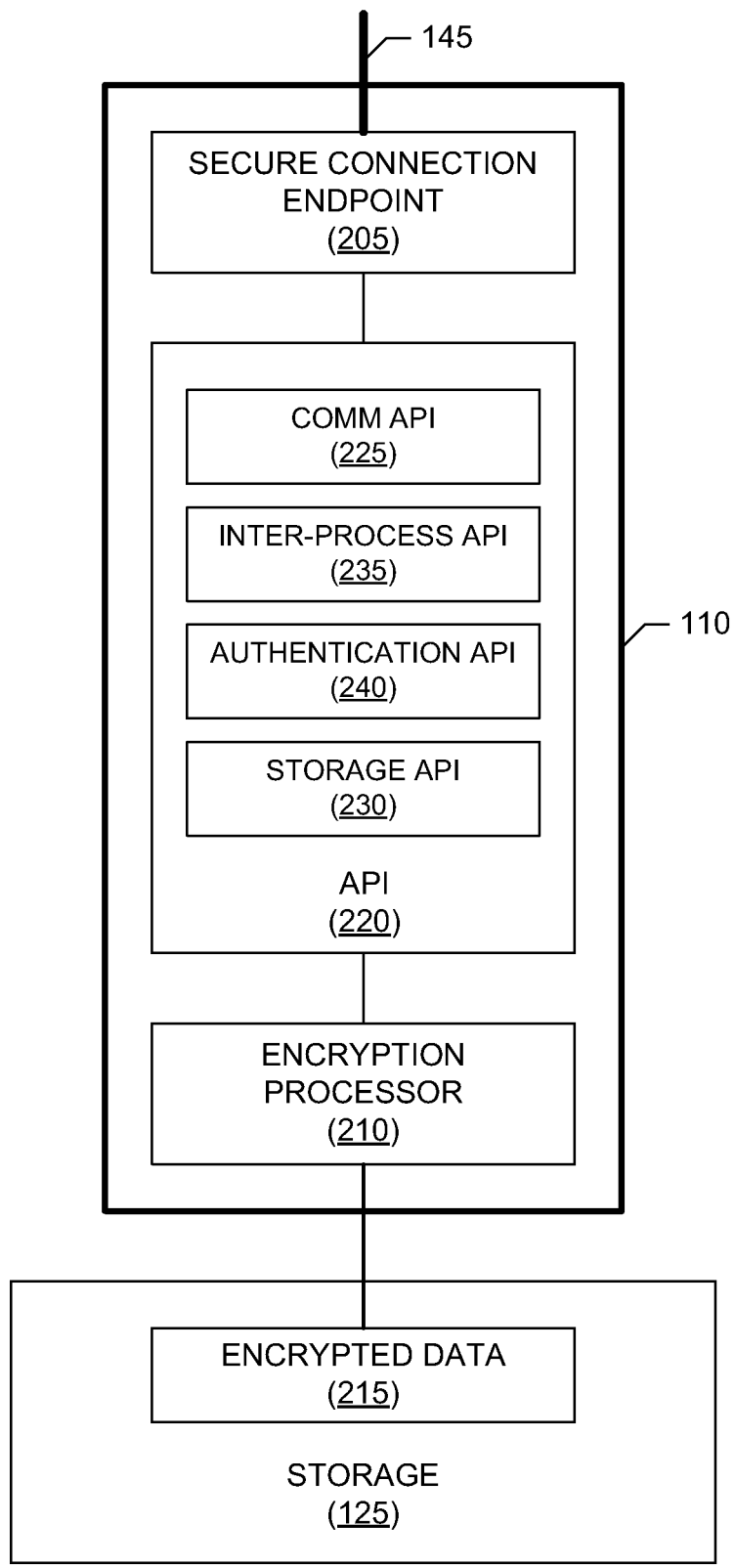
FIG. 2 is a block diagram illustrating an example implementation of the secure desktop of FIG. 1.

A block diagram of an example implementation of the secure desktop 110 of FIG. 1 is illustrated in FIG. 2. Similar elements in FIGS. 1 and 2 are labeled with the same reference numerals. The secure desktop 110 of FIG. 2 includes an example secure connection endpoint 205 to establish the secure connection 145 with the trusted entity 140 and to provide the endpoint on the computing platform 105 for the secure connection 145. For example, the secure connection 145 established by the secure connection endpoint 205 can be any type of secure connection implemented using any type of secure connection technology, such as public key encryption, symmetric key encryption, certificates, two-factor authentication, etc. In some examples, the secure connection 145 is established after the secure connection endpoint 205 has authenticated the secure desktop 110 and/or a user of the secure desktop 110 with the trusted entity 140. For example, the secure connection endpoint 205 can provide authentication information for the secure desktop 110 to the trusted entity 140 to enable the trusted entity 140 to authenticate the secure desktop 110 and, when authentication is successful, permit the secure connection endpoint 205 of the secure desktop 110 to establish the secure connection 145. Examples of such authentication information for the secure desktop 110 include, but are not limited to, digital certificate(s) and/or signature(s) associated with the secure desktop 110, an identification checksum associated with the secure desktop, signed identification information, etc. Additionally or alternatively, the secure connection endpoint 205 can provide authentication information for a user of the secure desktop 110 to the trusted entity 140 to enable the trusted entity 140 to authenticate the user and, when authentication is successful, permit the secure connection endpoint 205 of the secure desktop 110 to establish the secure connection 145. Examples of such authentication information for a user of the secure desktop 110 include, but are not limited to, username and password information, biometric information, etc., and/or other information to support one, two or multiple factor authentication.

The secure desktop 110 of FIG. 2 also includes an example encryption processor 210 to store local data 215 securely in the storage 125 for use by the secure desktop 110. In some examples, sensitive data used by the secure desktop 110, and/or one or more trusted applications executing in the context of the secure desktop 110, as described in greater detail below, is stored at the trusted entity 140, in a network cloud, etc. However, the secure desktop 110 also supports storing data locally (e.g., in the computing platform 105) in a secure manner such that any sensitive data included in the stored local data is secure. Thus, the encryption processor 210 protects the local data 215 stored by the secure desktop 110 from being read and compromised by, for example, one or more of the untrusted applications U_APP1-U_APP3. For example, the encryption processor 210 can use any type of key-based encryption (e.g., public-key encryption, symmetric-key encryption, etc.) to secure the local data 215 in the storage 125. In some examples, the encryption processor 210 can provide just-in-time encryption of the local data 215 when the local data 215 is being written to the storage 125 by the secure desktop 110 and/or one or more trusted applications executing in the context of the secure desktop 110. In such an example, the encryption processor 210 can also provide just-in-time decryption of the local data 215 when the local data 215 is being read from the storage 125 by the secure desktop 110 and/or one or more trusted applications executing in the context of the secure desktop 110. Because untrusted applications, such as the applications U_APP1-U_APP3, do not possess or otherwise have access to the encryption key(s)

used by the encryption processor 210 to decrypt and/or encrypt the encrypted local data 215, the encrypted local data 215 is secure and protected from unauthorized or otherwise improper access by any untrusted application.

In some examples, the encryption processor 210 generates the set of one or more encryption keys to be used to encrypt the local data 215 using any type of key generation algorithm using any appropriate input information, such as user information (e.g., username, password, etc.) provided by a user, biometric data, data obtained from a security token, etc., or any combination thereof. In some examples, the trusted entity 140 associated with a particular secure connection 145 is responsible for managing and providing the set of one or more encryption keys to be used by the encryption processor 210 to encrypt local data 215 associated with that particular trusted entity. In such examples, the encryption processor 210 can receive the set of keys for encrypting the local data from the appropriate trusted entity 140 over the secure connection 145 that has already been established with the trusted entity 140. The encryption processor 210 uses the generated/received set of keys to perform just-in-time encryption of data related to the trusted entity 140 that to be written to the local storage 125, and to perform just-in-time decryption of this data when it is to be read from the local storage 125. In some examples, when the secure desktop 110 detects that the secure connection 145 with the trusted entity 140 has terminated (e.g., voluntarily by the secure desktop 110 and/or the trusted entity 140, or involuntarily due to one or more error conditions), the encryption processor 210 can revoke (e.g., by randomization or other intentional overwriting and/or corruption of the stored key(s) to make the key(s) unusable) or otherwise discard the set of encryption keys to protect the local data 215 from any subsequent access attempts. Additionally or alternatively, in some examples the encryption processor 210 can wait to revoke the set of keys until the secure desktop itself 110 is to be terminated to permit access to the sensitive, secured data while the secure desktop 110 is active (even if the secure connection 145 has been terminated). When the computing platform 105 is a portable or shared platform, the foregoing feature(s) can be especially useful for protecting sensitive data included in encrypted local data 215 when the computing platform 105 is lost or being used by a different user.

In some examples, the encryption processor 210 may wait until after expiration of time period beginning when termination of the secure connection 145 is detected to revoke or otherwise discard the set of encryption keys used to encrypt the local data 215. In this way, the encryption processor 210 can support an associated period of time during which off-line access to the encrypted local data 215 is permitted. The time period for off-line access can be a configuration parameter of the secure desktop 110, a parameter provided by the trusted entity 140, a parameter entered by a user, etc.

The secure desktop 110 of FIG. 2 also includes an example application programming interface (API) 220 to enable one or more trusted applications to access the secure desktop 110 and thereby access the secure connection 145 and the encrypted local data 215 provided by the secure desktop 110. In other words, the API 220 provides a plug-in interface via which trusted application(s) (e.g., trusted plug-in extensions) can execute in the context of the secure desktop 110. In this way, the API 220 supports extending the capabilities of the secure desktop 110 over time. The API 220 can be implemented as part of a software development kit (SDK) and/or any other type of API architecture.

In the illustrated example, the API 220 includes an example communication API 225, an example storage API 230, an example inter-process API 235 and an example authentication API 240. In the example of FIG. 2, the communication API 225 provides trusted applications with access to the secure connection 145 provided by the secure desktop 110. For example, the communication API 225 can be used by a trusted application to provide data to the secure connection endpoint 205 that is to be sent to the trusted entity 140 via the secure connection 145. The communication API 225 can also be used by the trusted application to obtain data from the secure desktop 110 that has been received from the trusted entity 140 via the secure connection 145 and the secure connection endpoint 205.

In the example of FIG. 2, the storage API 230 provides trusted applications with access to the encrypted local data 215 stored in the storage 125. For example, the storage API 230 can be used by a trusted application to provide data to the secure desktop 110 that is to be included by the encryption processor 210 in the secure local data 215 written to the storage 125. The storage API 230 can also be used by the trusted application to retrieve data from the secure desktop 110 that is read by the encryption processor 210 from the secure local data 215 stored in the storage 125.

In the example of FIG. 2, the inter-process API 235 provides trusted applications with access to other trusted applications executing in the context of the secure desktop 110. For example, the inter-process API 235 can be used by a trusted application to address and communicate data to another trusted application already associated with the secure desktop 110. The inter-process API 235 can also be used by the trusted application to address and receive data from another trusted application already associated with the secure desktop 110.

In some examples, the secure desktop 110 does not expose the API 220 (or at least some portions of the API 220) to an application until the application has been authenticated by the secure desktop 110 and thereby becomes a trusted application. This feature can prevent untrusted applications, such as the applications U_APP1-U_APP3 from accessing the API 220 and gaining access to the secure connection 145, the encrypted local data 215 and/or one or more trusted applications. For example, the secure desktop 110 may expose just the authentication API 240 to an application requesting access to thereby provide an interface via which the application can be authenticated. The application can then use the authentication API 240 to provide authentication information, such as a digital certificate and/or signature associated with the application, an identification checksum associated with the application, signed identification information, etc. Upon successful authentication of the application, the secure desktop 110 considers the application to be a trusted application and exposes the rest of the API 220 (or one or more of the other API components 225-235) to this trusted application.

Figure 3:
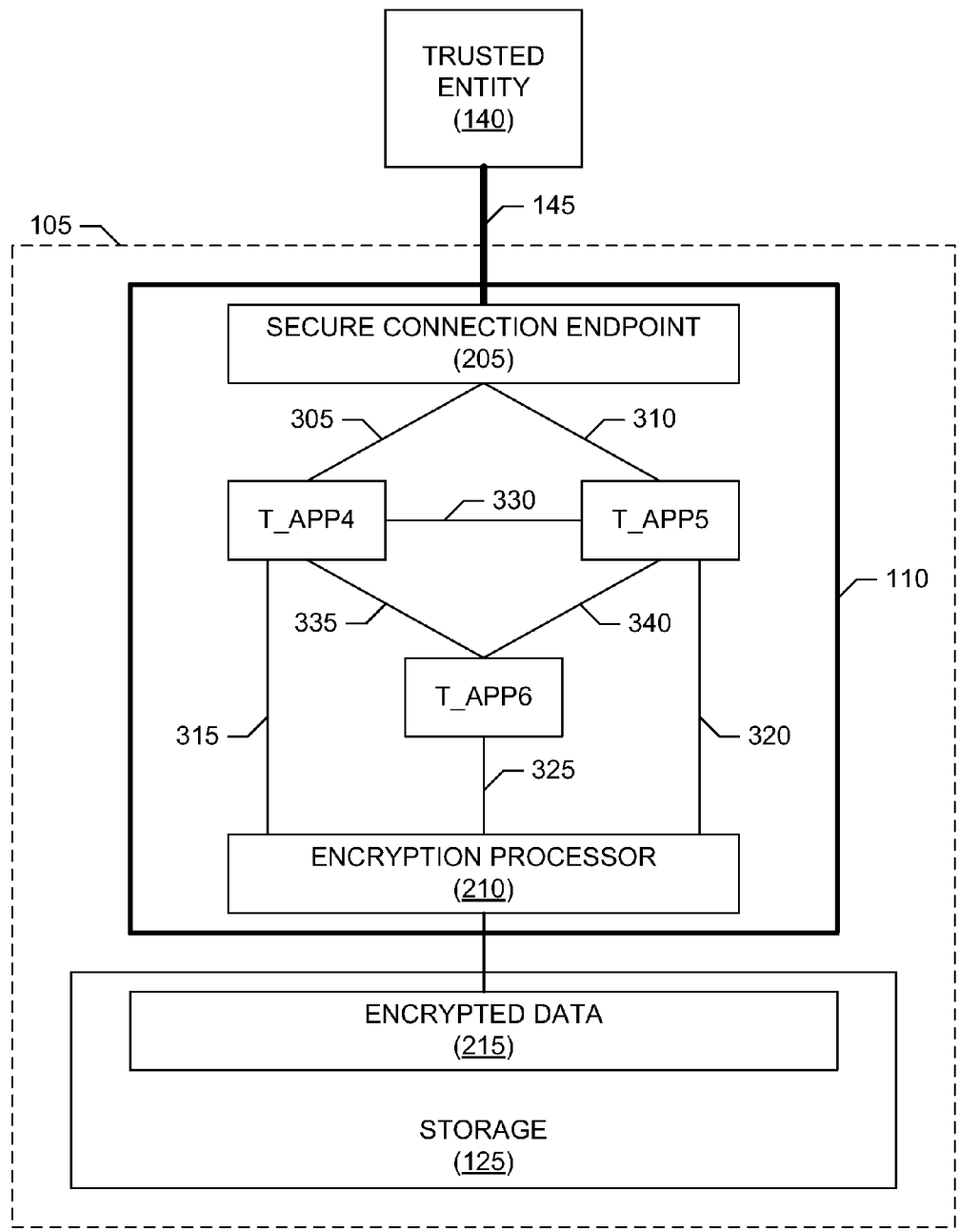
FIG. 3 is a block diagram illustrating an example operation of the secure desktop of FIGS. 1 and/or 2 in the example computing platform of FIG. 1.

FIG. 3 is a block diagram illustrating example trusted applications T_APP4, T_APP5 and T_APP6 executing in the context of the secure desktop 110 of FIGS. 1-2 in the computing platform 105 of FIG. 1. Similar elements in FIGS. 1-3 are labeled with the same reference numerals. Although three (3) trusted applications T T_APP4, T_APP5 and T_APP6 are illustrated in the example of FIG. 3, the secure desktop 110 in the computing platform 105 can support any appropriate number of trusted applications. In the illustrated example of FIG. 3, the trusted applications T_APP4, T_APP5 and T_APP6 have authenticated with the secure desktop 110 via, for example, its authentication API 240. Accordingly, the applications T_APP4, T_APP5 and T_APP6 are considered by the secure desktop 110 to be trusted and, thus, the secure desktop 110 exposes the rest of the components 225-235 of its API 220 to the trusted applications T_APP4, T_APP5 and T_APP6.

In the illustrated example, the trusted applications T_APP4 and T_APP5 use, for example, the communication API 225 exposed by the secure desktop 110 to interface with the secure connection endpoint 205 of the secure desktop 110 and thereby gain access to the secure connection 145 with the trusted entity 140. (In FIG. 3, these interfaces between the trusted applications T_APP4 and T_APP5 and the secure connection endpoint 205 are depicted by lines 305 and 310.) Additionally, in the example of FIG. 3, the trusted applications T_APP4, T_APP5 and T_APP6 use, for example, the storage API 230 exposed by the secure desktop 110 to interface with the encryption processor 210 and thereby gain access to the encrypted local data 215 stored in the otherwise unsecured storage 125 of the computing platform 105. (In FIG. 3, these interfaces between the trusted applications T_APP4, T_APP5 and T_APP6 and the encryption processor 210 are depicted by lines 315, 320 and 325.) In the illustrated example of FIG. 3, the trusted applications T_APP4, T_APP5 and T_APP6 also use, for example, the inter-process API 235 exposed by the secure desktop 110 to interface and exchange data amongst each other. (In FIG. 3, the inter-process interfaces between the trusted applications T_APP4, T_APP5 and T_APP6 are depicted by lines 330, 335 and 340.)

While example manners of implementing the secure desktop 110 have been illustrated in FIGS. 1-3, one or more of the elements, processes and/or devices illustrated in FIGS. 1-3 may be combined, divided, re-arranged, omitted, eliminated and/or implemented in any other way. Further, the example secure connection endpoint 205, the example encryption processor 210, the example API 220, the example communication API 225, the example storage API 230, the example inter-process API 235, the example authentication API 240 and/or, more generally, the example secure desktop 110 of FIGS. 1-3 may be implemented by hardware, software, firmware and/or any combination of hardware, software and/or firmware. Thus, for example, any of the example secure connection endpoint 205, the example encryption processor 210, the example API 220, the example communication API 225, the example storage API 230, the example inter-process API 235, the example authentication API 240 and/or, more generally, the example secure desktop 110 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example secure desktop 110, the example secure connection endpoint 205, the example encryption processor 210, the example API 220, the example communication API 225, the example storage API 230, the example inter-process API 235 and/or the example authentication API 240 are hereby expressly defined to include a tangible computer readable medium such as a memory, digital versatile disk (DVD), compact disk (CD), etc., storing such software and/or firmware. Further still, the example secure desktop 110 of FIGS. 1-3 may include one or more elements, processes and/or devices in addition to, or instead of, those illustrated in FIGS. 1-3, and/or may include more than one of any or all of the illustrated elements, processes and devices.

Flowcharts representative of example machine readable instructions that may be executed to implement the example secure desktop 110, the example secure connection endpoint 205, the example encryption processor 210, the example API 220, the example communication API 225, the example storage API 230, the example inter-process API 235 and/or the example authentication API 240 are shown in FIGS. 4-7. In these examples, the machine readable instructions represented by each flowchart may comprise one or more programs for execution by a processor, such as the processor 812 shown in the example processing system 800 discussed below in connection with FIG. 8. Alternatively, the entire program or programs and/or portions thereof implementing one or more of the processes represented by the flowcharts of FIGS. 4-7 could be executed by a device other than the processor 812 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 4-7 may be implemented manually. Further, although the example machine readable instructions are described with reference to the flowcharts illustrated in FIGS. 4-7, many other techniques for implementing the example methods and apparatus described herein may alternatively be used. For example, with reference to the flowcharts illustrated in FIGS. 4-7, the order of execution of the blocks may be changed, and/or some of the blocks described may be changed, eliminated, combined and/or subdivided into multiple blocks.

As mentioned above, the example processes of FIGS. 4-7 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4-7 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 4:
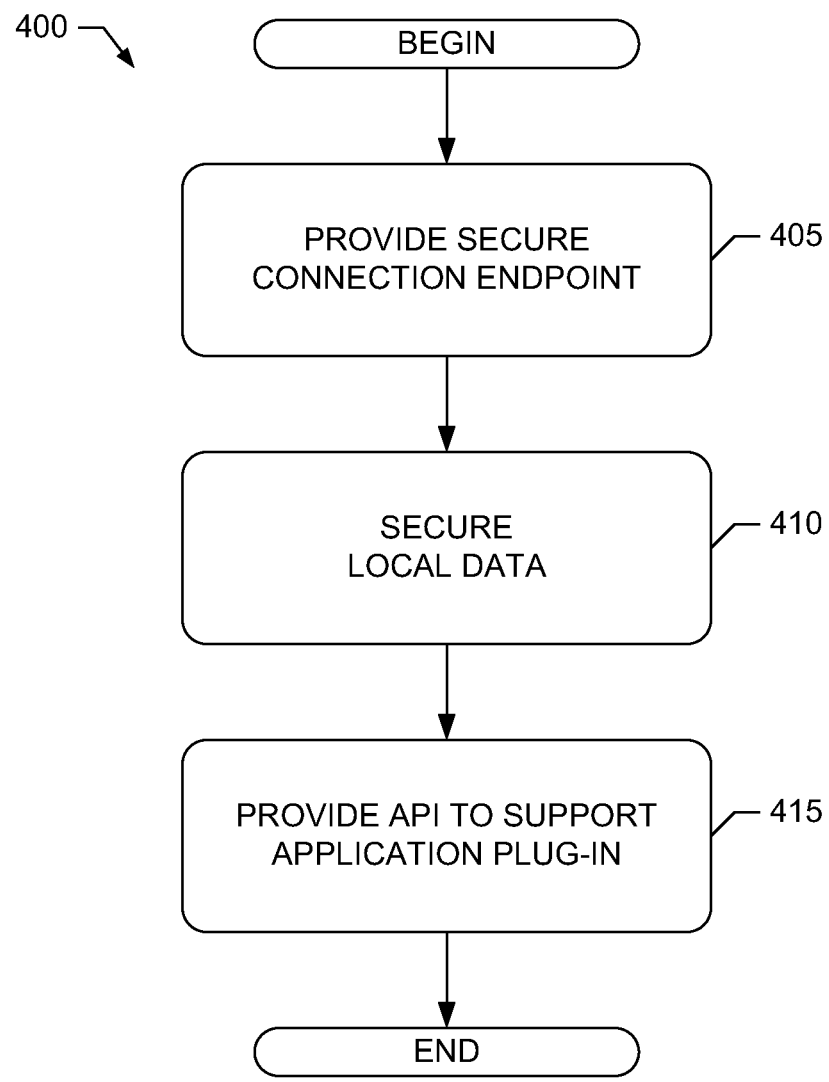
FIG. 4 is a flowchart representative of example machine readable instructions that may be executed to implement the example secure desktop of FIGS. 1 and/or 2.
Figure 5:
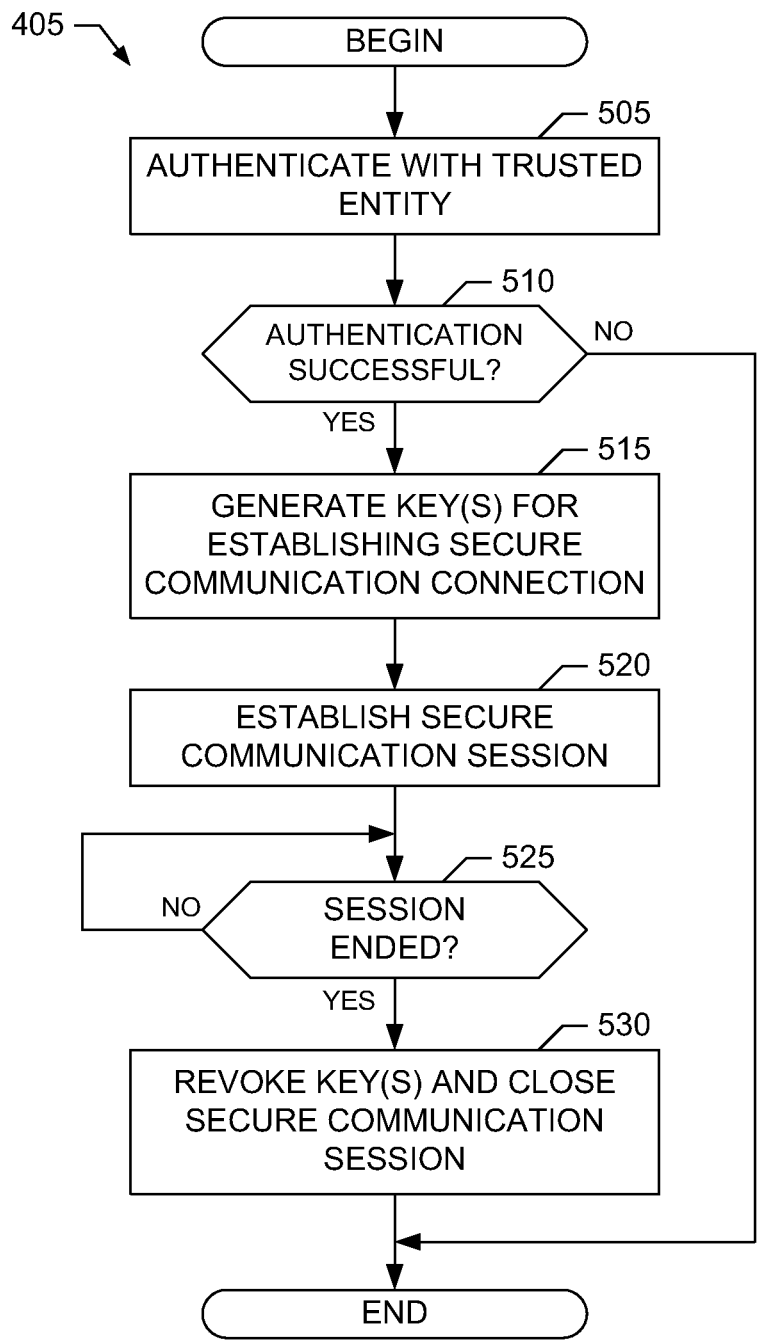
FIG. 5 is a flowchart representative of example machine readable instructions to implement a secure connection endpoint that may be used to implement the example machine readable instructions of FIG. 4 and/or the example secure desktop of FIGS. 1 and/or 2.
Figure 6:
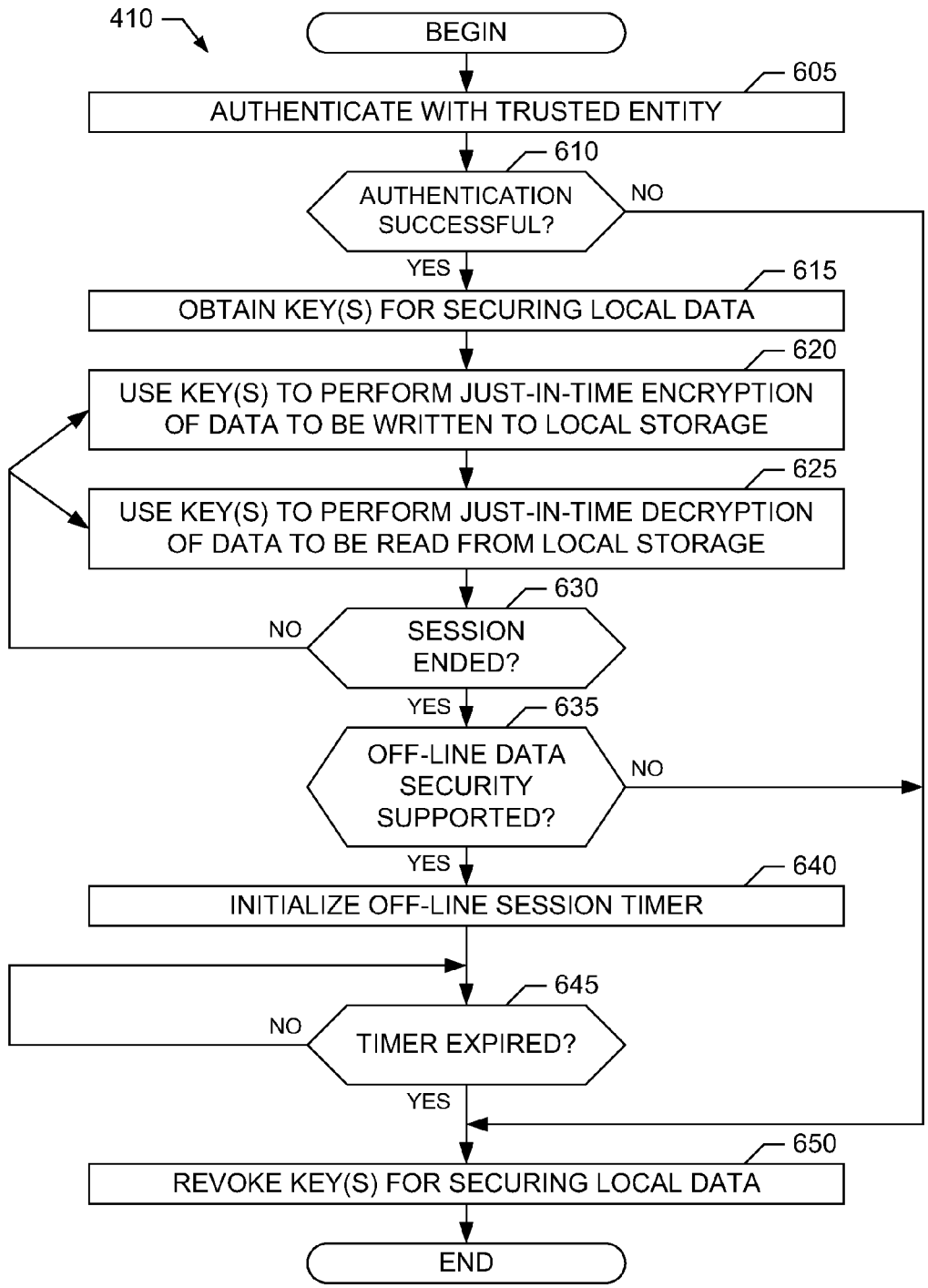
FIG. 6 is a flowchart representative of example machine readable instructions to secure local data that may be used to implement the example machine readable instructions of FIG. 4 and/or the example secure desktop of FIGS. 1 and/or 2.
Figure 7:
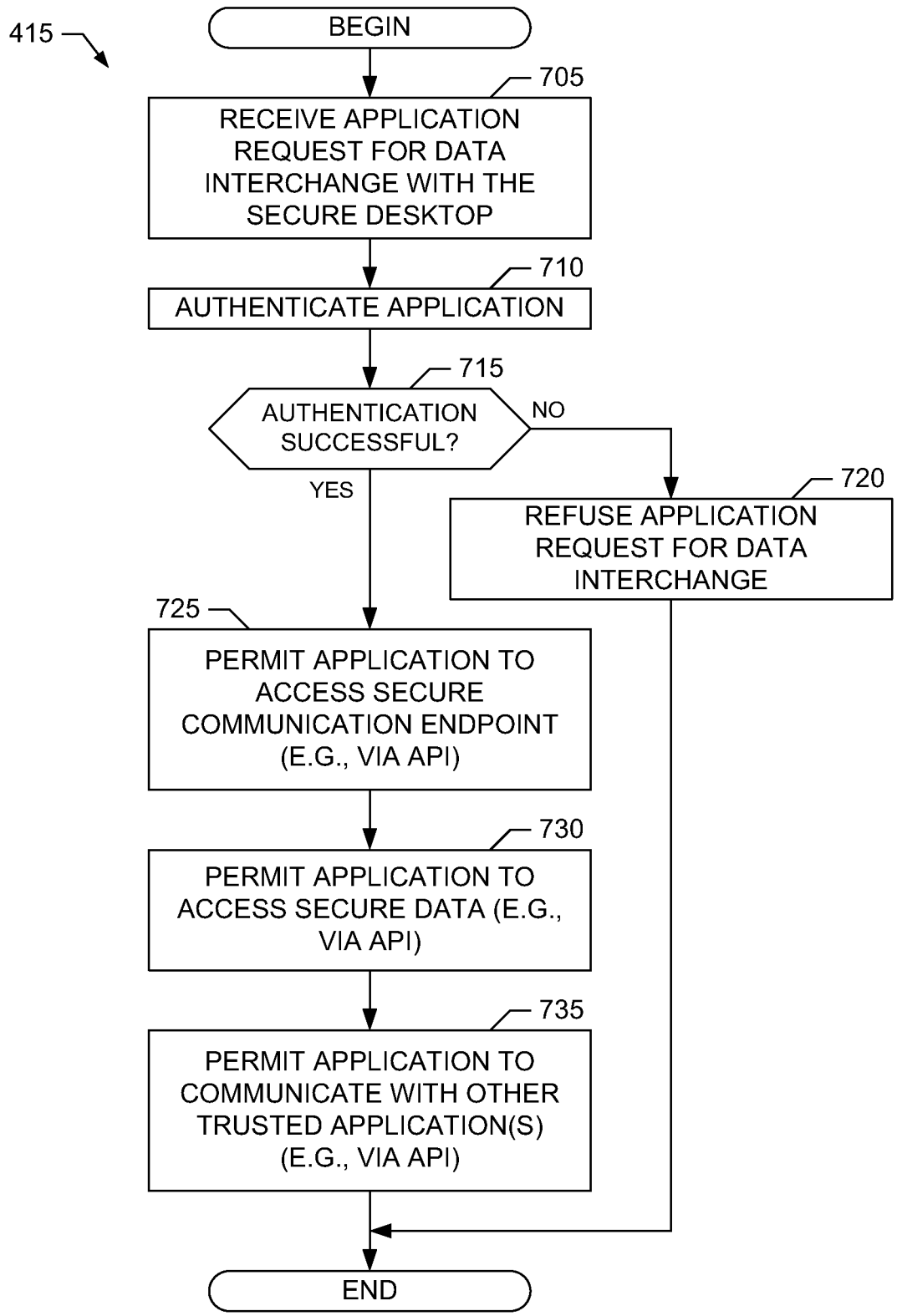
FIG. 7 is a flowchart representative of example machine readable instructions to implement an application programming interface that may be used to implement the example machine readable instructions of FIG. 4 and/or the example secure desktop of FIGS. 1 and/or 2.

Example machine readable instructions 400 that may be executed to implement the secure desktop 100 of FIGS. 1-3 are represented by the flowchart shown in FIG. 4. With reference to the preceding figures, the machine readable instructions 400 of FIG. 4 begin execution at block 405 at which the secure desktop 110 provides an endpoint for the secure connection 145 with the trusted entity 140, as described above. Example machine readable instructions that may be used to implement the processing at block 405 are illustrated in FIG. 5, which is described in greater detail below. At block 410, the secure desktop 110 secures the local data 215, including any sensitive data associated with the trusted entity 140, that is used by the secure desktop 110 and/or any trusted application executing in the context of the secure desktop 110, as described above. Example machine readable instructions that may be used to implement the processing at block 410 are illustrated in FIG. 6, which is described in greater detail below. At block 415, the secure desktop 110 provides its API 220 to trusted applications to support plug-in extension of the functionality of the secure desktop 110, as described above. Example machine readable instructions that may be used to implement the processing at block 415 are illustrated in FIG. 7, which is described in greater detail below.

Example machine readable instructions 405 that may be executed to implement the secure connection endpoint 205 of the secure desktop 110 of FIG. 2, and/or used to implement the processing at block 405 of FIG. 4, are represented by the flowchart shown in FIG. 5. With reference to the preceding figures, the machine readable instructions 405 of FIG. 5 begin execution at block 505 at which the secure connection endpoint 205 of the secure desktop 110 provides authentication information to the trusted entity 140 (e.g., via an untrusted communication session over the untrusted network 120) to enable the trusted entity to authenticate the secure desktop 110 and/or a user of the secure desktop 110, as described above. If authentication is successful (block 510), then at block 515 the secure connection endpoint 205 generates a set of one or more session keys (e.g., public encryption keys, symmetric encryption keys, etc.) to be used to establish the secure connection 145 with the trusted entity 140. For example, the secure connection endpoint 205 can use any type of key generation algorithm using any appropriate input information known by both the trusted entity 140 and the secure desktop 110 such that both the secure connection endpoint 205 and the trusted entity 140 can independently generate the session key(s) for establishing the secure connection 145. Such input information can include, for example, pre-exchanged user information (e.g., username, password, etc.) and/or biometric data provided by a user, data associated with a security token provided by the trusted entity 140 to a user of the computing platform 105, etc., or any combination thereof.

At block 520, the secure connection endpoint 205 uses the generated session key(s) to establish the secure connection 145 over the untrusted network connection 115 and the untrusted network 120, as described above. When the communication session between the secure desktop 110 and the trusted entity 140 ends (block 525), at block 530 the secure connection endpoint 205 revokes (e.g., via randomization or other intentional overwriting and/or corruption of the stored key(s) to make the key(s) unusable) or otherwise discards the session key(s) and closes the secure connection 145 with the trusted entity 140.

Example machine readable instructions 410 that may be executed to implement the encryption processor 210 of the secure desktop 110 of FIG. 2, and/or used to implement the processing at block 410 of FIG. 4, are represented by the flowchart shown in FIG. 6. With reference to the preceding figures, the machine readable instructions 410 of FIG. 6 begin execution at block 605 at which the secure desktop 110 provides authentication information to the trusted entity 140 (e.g., via an untrusted communication session over the untrusted network 120) to enable the trusted entity to authenticate the secure desktop 110 and/or a user of the secure desktop 110, as described above. If authentication is successful (block 610), then at block 615 the secure connection endpoint 205 obtains a set of one or more security keys (e.g., public encryption keys, symmetric encryption keys, etc.) to be used by the encryption processor 210 to secure the local data 215 used by the secure desktop 110 and associated with the trusted entity 140, as described above. In some examples, the processing at blocks 605-615 of FIG. 6 can be omitted and the security key(s) obtained by the secure desktop 110 at block 615 of FIG. 6 may be the same as the session key(s) generated by the secure desktop 110 at block 515 of FIG. 5.

At blocks 620 and 625, the encryption processor 210 of the secure desktop 110 uses the security key(s) to perform just-in-time encryption of local data 215 to be written by the secure desktop 110 (or a trusted application executing in the context of the secure desktop 110) to the storage 125, and to perform just-in-time decryption of the local data 215 to be read by the secure desktop 110 (or a trusted application executing in the context of the secure desktop 110) from the storage 125, as described above. At block 630, the encryption processor 210 determines whether the secure connection 145 has been terminated and, thus, the current session between the secure desktop 110 and the trusted entity 140 has ended. If the current session between the secure desktop 110 and the trusted entity 140 has ended (block 630), then at block 635 the encryption processor 210 determines whether off-line data security is supported for local data associated with this particular trusted entity 140. If off-line data security is supported (block 635) and, thus, off-line access of the secure local data 215 associated with this trusted entity 140 is permitted, then at block 640 the encryption processor 210 initializes an off-line session timer or similar time counting mechanism to enable determination of whether a time period for off-line data access has expired, as described above. After the time period has expired (block 645) or if off-line data security is not supported (block 635), then at block 650 the encryption processor 210 revokes or otherwise discards the security key(s) associated with this trusted entity 140 to thereby prevent subsequent access to the local data 215 associated with the trusted entity 140.

Example machine readable instructions 415 that may be executed to implement the API 220 of the secure desktop 110 of FIG. 2, and/or used to implement the processing at block 415 of FIG. 4, are represented by the flowchart shown in FIG. 7. With reference to the preceding figures, the machine readable instructions 415 of FIG. 7 begin execution at block 705 at which the secure desktop 110 receives a request from an application to initiate a data interchange with the secure desktop 110. At block 710, the secure desktop 110 exposes the authentication API 240 of its API 220 to the application to enable the application to provide authentication information to the secure desktop 110, as described above. At block 715, the secure desktop 110 authenticates the application using the authentication information received via the authentication API 240. If the application is an untrusted application, such as the untrusted application U_APP2, then authentication is unsuccessful (block 715), and at block 720 the secure desktop 110 refuses the application's request to initiate the data interchange.

However, if the application is a trusted application, such as the trusted application T_APP4, then authentication is successful (block 715), and at block 725 the secure desktop 110 exposes the communication API 225 of its API 220 to enable the trusted application to access the secure communication endpoint 205 of the secure desktop 110 and thereby access the secure connection 145 with the trusted entity 140, as described above. At block 730, the secure desktop 110 exposes the storage API 230 of its API 220 to enable the trusted application to access the secure local data 215 stored in the storage 125, as described above. At block 735, the secure desktop 110 exposes the inter-process API 235 of its API 220 to enable the trusted application to communicate with other trusted applications, such as the trusted applications T_APP5 and/or T_APP6, executing in the context of the secure desktop 110.

Figure 8:
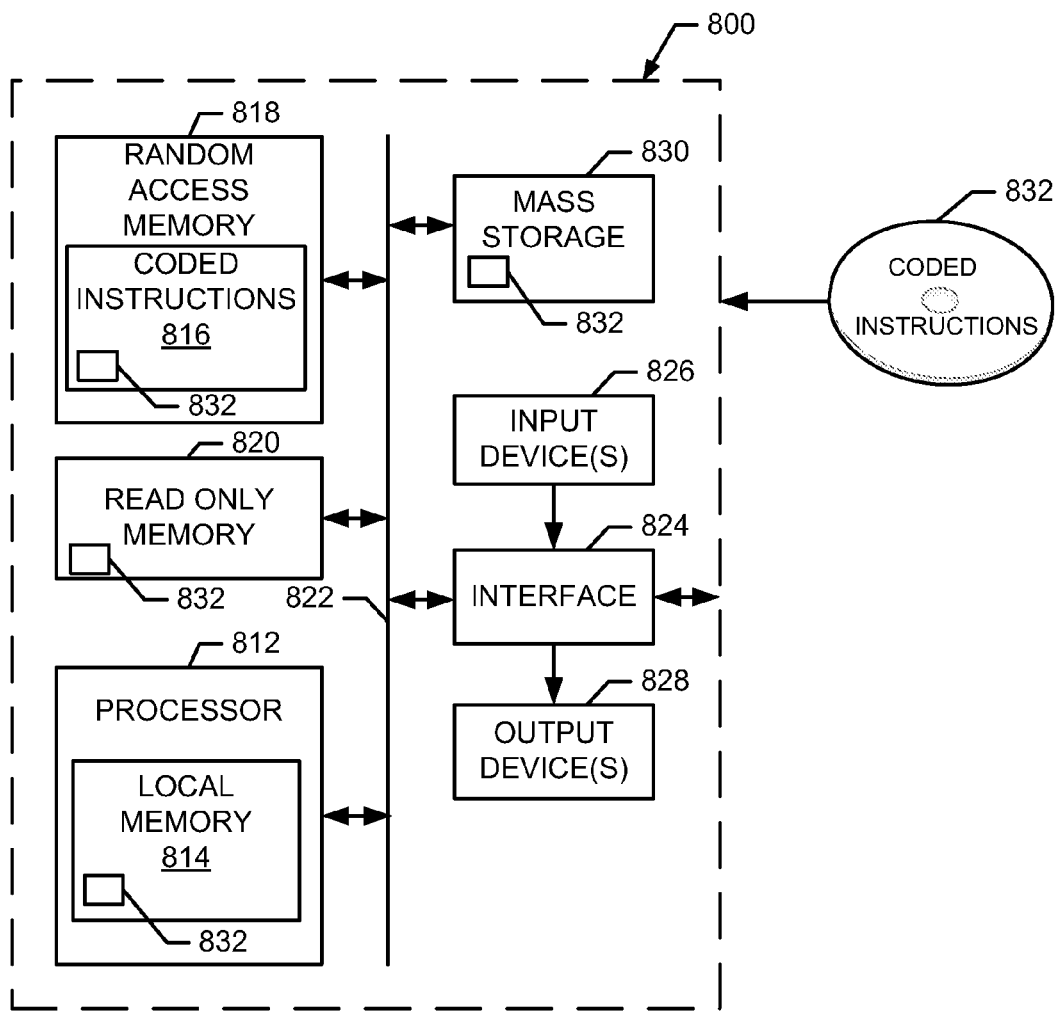
FIG. 8 is a block diagram of an example processing system that may execute the example machine readable instructions of FIGS. 4-6 and/or 7 to implement the example secure desktop of FIGS. 1 and/or 2.

FIG. 8 is a block diagram of an example processing system 800 capable of implementing the apparatus and methods disclosed herein. The processing system 800 can be, for example, a smartphone, a mobile phone, a personal computer, a personal digital assistant (PDA), an Internet appliance, a server, a set top box, a digital video recorder, a personal video recorder, a DVD player, a CD player, etc., or any other type of computing device.

The system 800 of the instant example includes a processor 812 such as a general purpose programmable processor. The processor 812 includes a local memory 814, and executes coded instructions 816 present in the local memory 814 and/or in another memory device. The processor 812 may execute, among other things, the machine readable instructions represented in FIGS. 4-7. The processor 812 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 812 is in communication with a main memory including a volatile memory 818 and a non-volatile memory 820 via a bus 822. The volatile memory 818 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 820 may be implemented by flash memory and/or any other desired type of memory device. Access to the main memory 818, 820 is typically controlled by a memory controller (not shown).

The processing system 800 also includes an interface circuit 824. The interface circuit 824 may be implemented by any type of interface standard, such as an Ethernet interface, a universal serial bus (USB), and/or a third generation input/output (3GIO) interface.

One or more input devices 826 are connected to the interface circuit 824. The input device(s) 826 permit a user to enter data and commands into the processor 812. The input device(s) can be implemented by, for example, a keyboard, a mouse, a touchscreen, a track-pad, a trackball, an isopoint and/or a voice recognition system.

One or more output devices 828 are also connected to the interface circuit 824. The output devices 828 can be implemented, for example, by display devices (e.g., a liquid crystal display, a cathode ray tube display (CRT)), by a printer and/or by speakers. The interface circuit 824, thus, typically includes a graphics driver card.

The interface circuit 824 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 800 also includes one or more mass storage devices 830 for storing machine readable instructions and data. Examples of such mass storage devices 830 include floppy disk drives, hard drive disks, compact disk drives and digital versatile disk (DVD) drives. In some examples, the mass storage device 830 may implement the storage 125. Additionally or alternatively, in some examples the volatile memory 818 may implement the storage 125.

The coded instructions 832 of FIGS. 4-7 may be stored in the mass storage device 830, in the volatile memory 818, in the non-volatile memory 820, in the local memory 814 and/or on a removable storage medium, such as a CD or DVD 832.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, as used herein, when the phrase "at least" is used as a preamble of a claim, it is open-ended in the same manner as the term "comprising" is open ended.

Furthermore, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method for a computing platform, the method comprising:

establishing a secure communication connection between a secure desktop provided by the computing platform and a trusted entity using a first set of encryption keys, the secure communication connection being accessible to a trusted application authenticated with the secure desktop, the secure communication connection being inaccessible to an untrusted application not authenticated with the secure desktop;

securing data that is stored by the secure desktop in local storage associated with the computing platform using a second set of encryption keys, the stored data being accessible to the trusted application and inaccessible to the untrusted application;

in response to detecting that the secure communication connection has been terminated, revoking the first set of encryption keys and determining whether the secure desktop has been configured to support off-line data access; and in response to (1) detecting that the secure communication connection has been terminated and (2) determining that the secure desktop has been configured to support off-line access, waiting to revoke the second set of encryption keys until expiration of at least a first configurable time period beginning after detecting that the secure communication connection has been terminated to permit off-line access to the data that is stored by the secure desktop in the local storage.

2. The method as defined in claim 1, further including refusing inter-process communication requests unless made via an application programming interface provided by the secure desktop.

3. The method as defined in claim 1, wherein establishing the secure communication connection is performed in response to successful authentication of at least one of the secure desktop or a user associated with the secure desktop.

4. The method as defined in claim 1, further including:
authenticating the trusted application; and
when authentication of the trusted application is successful, exposing an application programming interface to the trusted application to enable the trusted application to access the secure communication connection.

5. The method as defined in claim 1, wherein securing the stored data includes:
using the second set of encryption keys to perform just-in-time encryption of data to be written to the local storage; and
using the second set of encryption keys to perform just-in-time decryption of data to be read from the local storage.

6. The method as defined in claim 1, further including:
detecting the termination of the secure communication connection between the trusted entity and the secure desktop.

7. The method as defined in claim 1 wherein the stored data is encrypted stored data, and further including:
authenticating the trusted application; and
when authentication of the trusted application is successful, exposing an application programming interface to the trusted application to enable the trusted application to access the encrypted stored data.

8. The method as defined in claim 1 further including exposing an application programming interface to a plurality of trusted applications to enable the plurality of trusted applications to access the secure communication connection and to access the stored data that is stored securely in the local storage, and to enable a first trusted application to communicate with a second trusted application.

9. A tangible machine readable medium comprising machine readable instructions which, when executed, cause a machine to perform operations comprising:
establishing a secure communication connection between a secure desktop provided by a computing platform and a trusted entity using a first set of encryption keys, the secure communication connection being accessible to a trusted application authenticated with the secure desktop, the secure communication connection being inaccessible to an untrusted application not authenticated with the secure desktop;

securing data that is stored by the secure desktop in local storage associated with the computing platform using a second set of encryption keys, the stored data being accessible to the trusted application and inaccessible to the untrusted application;

in response to detecting that the secure communication connection has been terminated, revoking the first set of encryption keys and determining whether the secure desktop has been configured to support off-line data access; and in response to (1) detecting that the secure communication connection has been terminated and (2) determining that the secure desktop has been configured to support off-line access, waiting to revoke the second set of encryption keys until expiration of at least a first configurable time period beginning after detecting that the secure communication connection has been terminated to facilitate off-line access to the data that is stored by the secure desktop in the local storage, the first configurable time period being input to the secure desktop by a user of the secure desktop.

10. The tangible machine readable medium as defined in claim 9, wherein the operations further include refusing inter-process communication requests unless made via an application programming interface provided by the secure desktop.

11. The tangible machine readable medium as defined in claim 9, wherein the operations further include establishing the secure communication connection in response to successful authentication of at least one of the secure desktop or a user associated with the secure desktop.

12. The tangible machine readable medium as defined in claim 9, wherein the operations further include:
authenticating the trusted application; and
when authentication of the trusted application is successful, exposing an application programming interface to the trusted application to enable the trusted application to access the secure communication connection.

13. The tangible machine readable medium as defined in claim 9, wherein the operations further include:
using the second set of encryption keys to perform just-in-time encryption of data to be written to the local storage; and
using the second set of encryption keys to perform just-in-time decryption of data to be read from the local storage.

14. The tangible machine readable medium as defined in claim 9, wherein the operations further include:
detecting the termination of the secure communication connection between the trusted entity and the secure desktop.

15. The tangible machine readable medium as defined in claim 9, wherein the stored data is encrypted stored data, and operations further include:
authenticating the trusted application; and
when authentication of the trusted application is successful, exposing an application programming interface to the trusted application to enable the trusted application to access the encrypted stored data.

16. The tangible machine readable medium as defined in claim 9 wherein the operations further include exposing an application programming interface to a plurality of trusted applications to enable the plurality of trusted applications to access the secure communication connection and to access the stored data that is stored securely in the local storage, and to enable a first trusted application to communicate with a second trusted application.

17. An apparatus comprising:
a communication interface to provide a network connection to an untrusted network;
a memory including machine readable instructions; and
a processor to execute the machine readable instructions to perform operations including:
   implementing a secure desktop;
   establishing a secure communication connection between a trusted entity and the secure desktop via the network connection using a first set of encryption keys, the secure communication connection being accessible to a plurality of trusted applications authenticated with the secure desktop, the secure communication connection being inaccessible to a plurality of untrusted applications not authenticated with the secure desktop;
   securing data that is stored by the secure desktop in the memory using a second set of encryption keys, the stored data being accessible to the plurality of trusted applications and inaccessible to the plurality of untrusted applications;
   exposing an application programming interface to the plurality of trusted applications to enable the plurality of trusted applications to access the secure communication connection and to access the stored data that is stored securely in the memory, the secure desktop to expose the application programming interface to a first trusted application after authenticating the first trusted application, the secure desktop to refuse inter-process communication requests unless made via the application programming interface;
   in response to detecting that the secure communication connection has been terminated, revoking the first set of encryption keys and determining whether the secure desktop has been configured to support off-line data access; and
   in response to (1) detecting that the secure communication connection has been terminated and (2) determining that the secure desktop has been configured to support off-line access, waiting to revoke the second set of encryption keys until expiration of at least a first configurable time period beginning after detecting that the secure communication connection has been terminated to permit off-line access to the data that is stored by the secure desktop in the memory, the first configurable time period being input to the secure desktop by a user of the secure desktop.

18. The apparatus as defined in claim 17, wherein the processor is to establish the secure communication connection in response to successful authentication of at least one of the secure desktop or a user associated with the secure desktop by the trusted entity.

19. The apparatus as defined in claim 17, wherein the operations further include:
   using the second set of encryption keys to perform just-in-time encryption of data to be written to the memory; and
   using the second set of encryption keys to perform just-in-time decryption of data to be read from the memory.

20. The apparatus as defined in claim 17, wherein the operations further include:
   detecting the termination of the secure communication connection between the trusted entity and the secure desktop.

* * * * *